(12) United States Patent
Flores et al.

(10) Patent No.: US 7,362,022 B2
(45) Date of Patent: Apr. 22, 2008

(54) COLUMN CAPILLARY SEAL FOR FDB MOTORS

(75) Inventors: Paco Flores, Felton, CA (US); Anthony J. Aiello, Santa Cruz, CA (US); Klaus D. Kloeppel, Watsonville, CA (US); Alan L. Grantz, Aptos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 92 days.

(21) Appl. No.: 11/126,932

(22) Filed: May 10, 2005

(65) Prior Publication Data

US 2006/0255672 A1   Nov. 16, 2006

(51) Int. Cl.
*H02K 7/08*   (2006.01)
(52) U.S. Cl. ...................................................... 310/90
(58) Field of Classification Search ............ 310/90, 310/90.5, 67 R
See application file for complete search history.

(56) References Cited

U.S. PATENT DOCUMENTS

| 5,427,456 | A | 6/1995 | Hensel |
| 5,536,088 | A | 7/1996 | Cheever et al. |
| 5,558,443 | A | 9/1996 | Zang |
| 5,558,445 | A | 9/1996 | Chen et al. |
| 5,847,479 | A | 12/1998 | Wang et al. |
| 5,980,113 | A | 11/1999 | Grantz |
| 6,020,664 | A * | 2/2000 | Liu et al. ................... 310/90 |
| 6,154,339 | A | 11/2000 | Grantz et al. |
| 6,378,209 | B1 | 4/2002 | Gomyo et al. |
| 6,404,087 | B1 * | 6/2002 | Ichiyama .................... 310/90 |
| 6,655,841 | B1 | 12/2003 | Heine et al. |
| 6,679,501 | B1 | 1/2004 | Pelstring et al. |
| 6,746,151 | B2 | 6/2004 | Le et al. |
| 6,828,709 | B2 | 12/2004 | Grantz et al. |
| 6,838,795 | B2 * | 1/2005 | Kloeppel et al. ............ 310/90 |
| 2003/0190100 | A1 | 10/2003 | Grantz et al. |
| 2005/0286820 | A1 | 12/2005 | Grantz et al. |
| 2006/0023982 | A1 | 2/2006 | Uenosono et al. |
| 2006/0285785 | A1 | 12/2006 | Flores et al. |

* cited by examiner

*Primary Examiner*—Dang Le
*Assistant Examiner*—Nguyen N. Hanh
(74) *Attorney, Agent, or Firm*—Stephen C. Durant; Novak Druce + Quigg LLP

(57) ABSTRACT

For a motor having liquid lubricated bearing surface(s), aspects include providing a column shaped Capillary Seal (CS) for storing and supply lubricating liquid to the bearing surface(s). The column shaped CS may have a cross-section substantially topologically equivalent to a circle. Aspects include disposing the column shaped CS between relatively rotational motor members or between relatively irrotational motor members. Other aspects include disposition of the column shaped CS in a spiral shape where one opening of the CS fluidicly communicates with the bearing surface and another opening vents to a gas environment. Still other aspects include disposing the column shaped CS circumferentially on surfaces of generally cylindrical shaped motor members. Such surfaces may oppose a second surface that is one of relatively rotational and relatively irrotational vis the surface. The column shaped CS may circumscribe an axis of a rotating member or may be disposed parallel to the axis of the rotating member.

24 Claims, 8 Drawing Sheets

PRIOR ART  FIG. 2a

COLUMN CAPILLARY SEAL FOR FDB MOTORS

BACKGROUND

1. Field

The present invention relates generally to seals for Fluid Dynamic Bearing (FDB) motors and more particularly to capillary seals and lubricating liquid reservoirs for use in FDB motors.

2. Description of Related Art

Capillary seals are presently used to retain lubricating liquid (e.g., oil) at hydrodynamic bearing surfaces of disc drive motors and to provide a reservoir of lubricating liquid sufficient to maintain lubrication of hydrodynamic bearing surfaces throughout an expected lifetime of the disc drive.

Typical capillary seals are formed between radially opposing surfaces of coaxially disposed relatively rotating members of a disc drive motor, e.g., between an outer surface of a fixed shaft and an inner surface of a rotating hub disposed around the shaft. Typically, either the shaft or the hub is machined so that the radially opposing surfaces taper with respect to each other and thereby form a capillary seal with an annular type cross-section that tapers in cross-sectional area from a vent opening to the hydrodynamic bearing.

Such capillary seals often have a relatively large cross-sectional area exposed to an ambient environment, and thus may be prone to losing fluid due to operational shock and/or evaporation. Accordingly, capillary seals and reservoirs using capillary forces that may have benefits including a reduction in a cross-sectional area exposed to an ambient environment and an increase in shock resistance of the seals and reservoirs are desired.

SUMMARY

In an aspect, a capillary seal comprises a structure having formed therein a column shaped first channel. The first channel has a first opening, a second opening, and a cross-section. The cross-section of the first channel at the first opening may have an area greater than an area of the cross-section of the first channel at the second opening. The first channel is formed for fluidic communication with a hydrodynamic bearing through the second opening and to a gaseous environment through the first opening. Lubricating liquid is disposed in the first channel.

Channels of column shaped seals may be disposed as spiral shapes, straight shapes, and other shapes on a surface. Multiple channels may be disposed as circumferential spiral shapes on generally cylindrical, spherical or conical surfaces, as co-axial spiral shapes on generally planar surfaces, as curved channels radiating from a central portion, as straight channels radiating from a central portion, as straight channels co-parallel and dispersed on a radial surface, and in a variety of other dispositions. Channel cross-sections according to various aspects described herein may be substantially topologically equivalent to circles, and may be like various shapes, including semi-circles, triangles, trapezoids, and rectangles.

Other aspects include motors using such capillary seal aspects as a means for storing and supplying lubricating liquid to a hydrodynamic bearing that supports relative rotation between a first motor member and a second motor member coaxially disposed about the first motor member. Such capillary seals may be disposed between relatively rotating motor members and between relatively stationary members. Capillary seals disposed between relatively stationary members may rotate with rotating members or be stationary with stationary members.

BRIEF DESCRIPTION OF THE DRAWINGS

For a fuller understanding of aspects and examples disclosed herein, reference is made to the accompanying drawings in the following description.

FIG. 2a illustrates a prior art capillary seal in the context of a vertical cross-section of a motor portion;

DETAILED DESCRIPTION

The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions. For example, aspects and examples may be employed in a variety of motors, including motors for use in disc storage drives. Motors for disc storage drives may be designed and may operate in a number of ways. The exemplary motors and other exemplary subject matter provided herein are for illustrating various aspects and are not intended to limit the range of motors and devices in which such examples and aspects may be applied.

Figure 1:
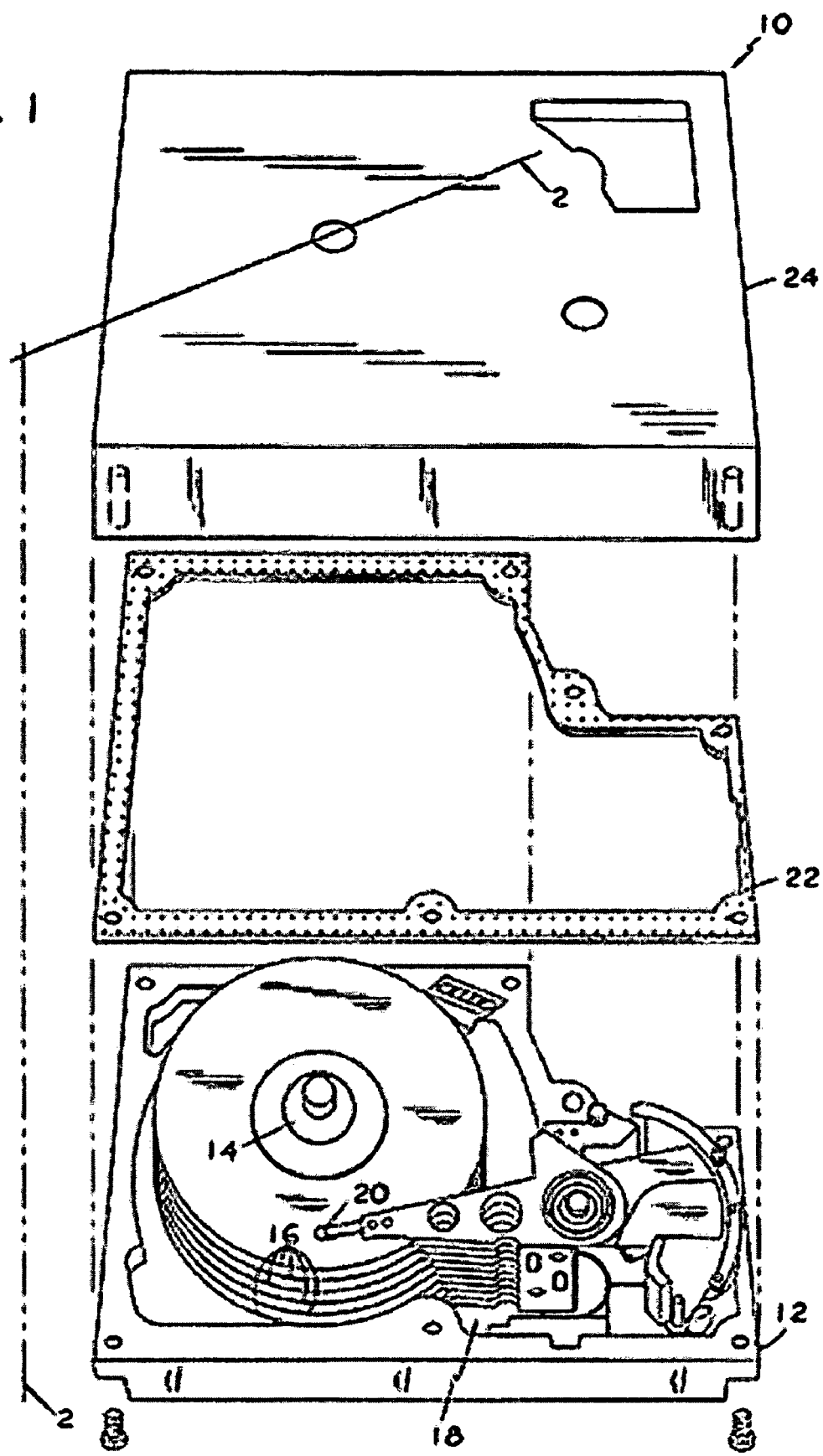
FIG. 1 illustrates a plan view of an exemplary disc drive.

Turning briefly to FIG. 1, a plan view of an exemplary magnetic disc drive storage system is illustrated. In this example, the storage system 10 includes a housing base 12 having spindle motor 14 which rotatably carries storage discs 16. An armature assembly 18 moves transducers 20 across the surface of the discs 16. The environment in which discs 16 rotate may be sealed by seal 22 and cover 24. In operation, discs 16 rotate at high speed while transducers 20 are positioned at any one of a radially differentiated track on the surface of the discs 16. This allows transducers 20 to read and write magnetically encoded information on the surfaces of discs 16 at selected locations. Discs 16 may rotate at many thousand RPM.

To provide for rotation of discs 16, spindle motor 14 typically includes at least one rotatable portion. The at least one rotatable portion in turn typically interfaces with one or more non-rotating surfaces, that may form journal and/or thrust hydrodynamic bearings. Hydrodynamic bearings often incorporate liquid lubricants, such as oil between the rotatable portion(s) and fixed portion(s) of spindle motor 14. Capillary seals help confine liquid lubricant to areas intended for lubrication and also provide a reservoir of liquid lubricant that compensates for losses due to evaporation, spillage and the like.

FIG. 2a illustrates a vertical cross-section of a portion of an exemplary motor 14 having a prior art capillary seal 210. This motor includes a shaft 205, a sealing cone 225 and a rotatable hub 215. The sealing cone 225 has an outer surface that radially opposes an inner surface of rotatable hub 215. The outer surface of sealing cone 225 and the inner surface of the rotatable hub 215 taper with respect to each other, thereby forming a capillary seal portion 210 that has a cross-section which tapers in area from a vent opening 245 towards an opening in fluidic communication with a hydrodynamic bearing surface 220. Capillary seal 210 is partially filled with a lubricating liquid that forms a meniscus.

A characterization of prior art capillary seals, such as capillary seal 210 may be obtained through topology. In topological theory, a geometric figure, such as a surface in two or three dimensions, may be characterized by its topographic equivalency to other geometric figures. Generally, a first geometric figure is equivalent to a second geometric figure if the first can be transformed into the second by transformations such as bending, stretching, twisting, and the like. However, if transformations such as tearing or cutting are required to transform the first into the second then the first and the second figures are not equivalent. For instance, a square surface may hypothetically be transformed into an equivalent circular surface by bending the edges of the square surface into a circular shape. Yet that square surface could not be transformed into an annular surface without cutting a portion of the surface of the square. Thus, a square surface is not topologically equivalent to an annular surface.

Viewed in horizontal cross-section, capillary seal 210 of FIG. 2a/b has a cross-section topologically equivalent to an annulus (e.g., a ring). The annulus has an inner boundary and an outer boundary, where the inner boundary of the annular cross-section is formed by the outer surface of sealing cone 225 and the outer boundary of the annular cross section is formed by the inner surface of rotatable hub 215.

Figure 2B:
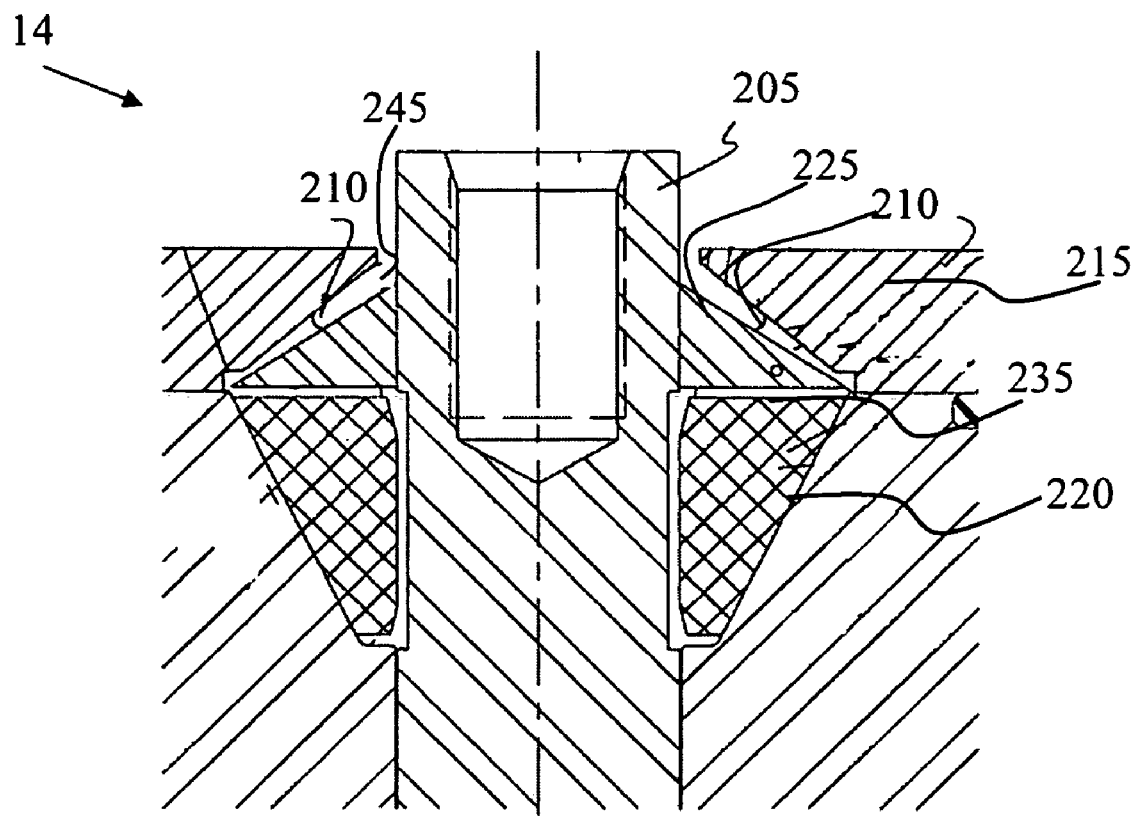
FIG. 2b illustrates a cross-section of prior art capillary seal.
Figure 2B:
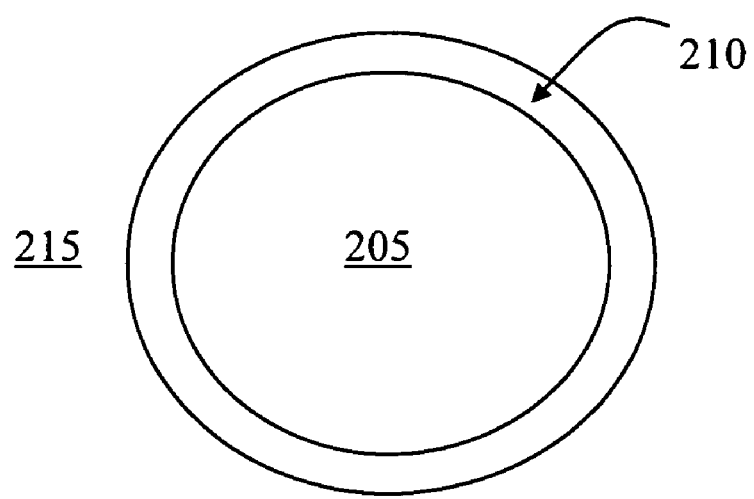

As illustrated in FIG. 2b, a difference between a radius of the inner boundary and a radius of the outer boundary of the annular cross-section is relatively small. A schematic view of capillary seal 210, with hub 215 and sealing cone 225 demarcated in FIG. 2b conceptually illustrates that prior art capillary seals typically have annular cross-sections, where the differences in radii of inner and outer boundaries of each cross-section is relatively small. Such considerations may also be viewed qualitatively, as described herein.

As a motor ages, lubricating liquid may be lost through evaporation or escape of the lubricating liquid from the capillary seal(s). Thus, a typical capillary seal is designed to provide a volume of lubricating liquid to compensate for that loss of lubricating liquid. As illustrated in FIG. 2a, providing a reservoir of lubricating liquid in the capillary seal imposes design difficulties because a longer capillary seal of the type in FIG. 2a/b is more difficult to fit within a motor and generally requires alterations in the design of various motor members. However, a wider capillary seal, which has a higher volume for a seal of a given length and taper angle, is typically less resistant to spillage under shock and presents a larger surface area to an ambient environment, which would result in more evaporation of lubricating liquid from the seal. For example, the prior art capillary seal of FIG. 2a/b has a relatively high width to length ratio.

Figure 3:
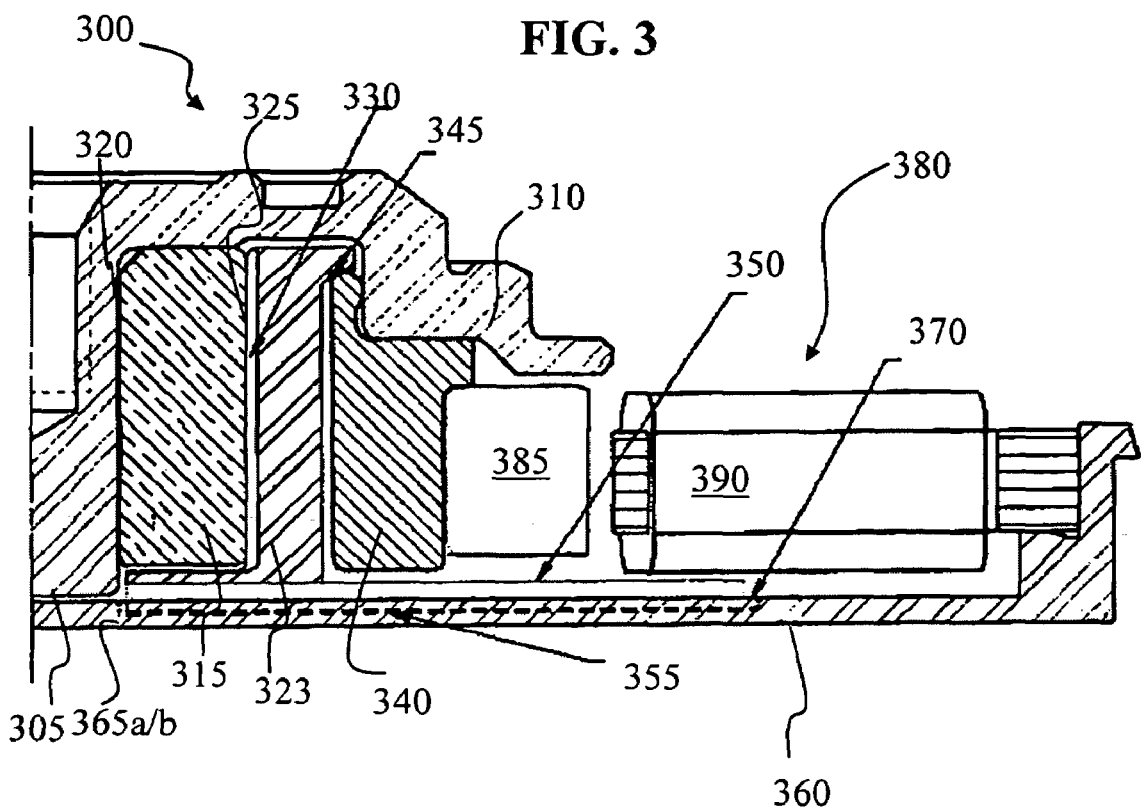
FIG. 3 illustrates a vertical cross-section of a portion of an exemplary disc drive motor.

Now turning to FIG. 3, a cross-section of a portion of an exemplary motor 300 having a capillary seal aspect is illustrated. The exemplary motor 300 includes a shaft 305, and a co-axially disposed hub 310 coupled with shaft 305. A sleeve 315 and shaft 305 interface to form hydrodynamic bearing regions 320, which support rotation of shaft 305 and hub 310 about sleeve 315. Sleeve 315 includes an outer surface 325 that interfaces with cup 323 to form a recirculation channel 330. A limiter 340 extends from hub 310 and interfaces with cup 323 to form an annular opening 345, at which a secondary meniscus of lubricating liquid forms.

The secondary meniscus aids in retaining lubricating liquid within motor 300, and advantageously has a small area exposed to an ambient environment 380 compared with many menisci of prior art capillary seals. Magnet 385 couples with limiter 340 to face a stator 390 that electromagnetically interacts with magnet 385 for rotating hub 310 and shaft 305. Motors according to exemplary aspects described herein may have additional secondary menisci formed at other openings by lubricating liquid. One of ordinary skill in the art would understand that exemplary aspects herein more generally illustrate that separate menisci may be used for retaining lubricating liquid in a reservoir and for reducing escape of lubricating liquid from openings at one or more parts of a motor.

Cup 323 supports sleeve 315. Cup 323 is in turn supported by a seal cover 350 that shields a column shaped capillary seal 355 (a disposition of which is generally illustrated by dashed lines) formed in base 360 from ambient environment 380. Capillary seal 355 has two openings: a bearing opening 365 and a vent opening 370. Bearing opening 365 provides fluidic communication of capillary seal 355 with hydrodynamic bearing regions 320. Vent opening 370 vents capillary seal 355 with ambient environment 380, which may contain air or another gas or mixture of gases. As illustrated, capillary seal 355 is disposed between two parts (cover 350 and base 360) that are not disposed for relative rotation with respect to each other. Moreover, capillary seal 355 is disposed between two surfaces other than the surfaces (surfaces of sleeve 315 and shaft 305) forming hydrodynamic bearing regions 320 (i.e., capillary seal 355 is not for example formed between sleeve 315 and shaft 305).

Other arrangements and configurations of the before mentioned parts are possible. For instance, cup 323 and sleeve 315 may be formed unitarily and recirculation channel 330 may be formed by removing material. Alternatively, recirculation channel 330 may be omitted. Magnet 385 may be coupled with limiter 340 by any number of methods known in the art. All the above mentioned components may have different absolute and/or relative (with respect to other parts) dimensions. For instance, hub 310 may have a bigger radius, limiter 340 may be shorter or longer, cup 323 may be thinner or thicker, and the like. Other capillary seal aspects will be illustrated in still other motor configurations and arrangements. Those of skill in the art would understand that some aspects illustrated with respect to other figures may be used in exemplary motor 300.

Figure 4A:
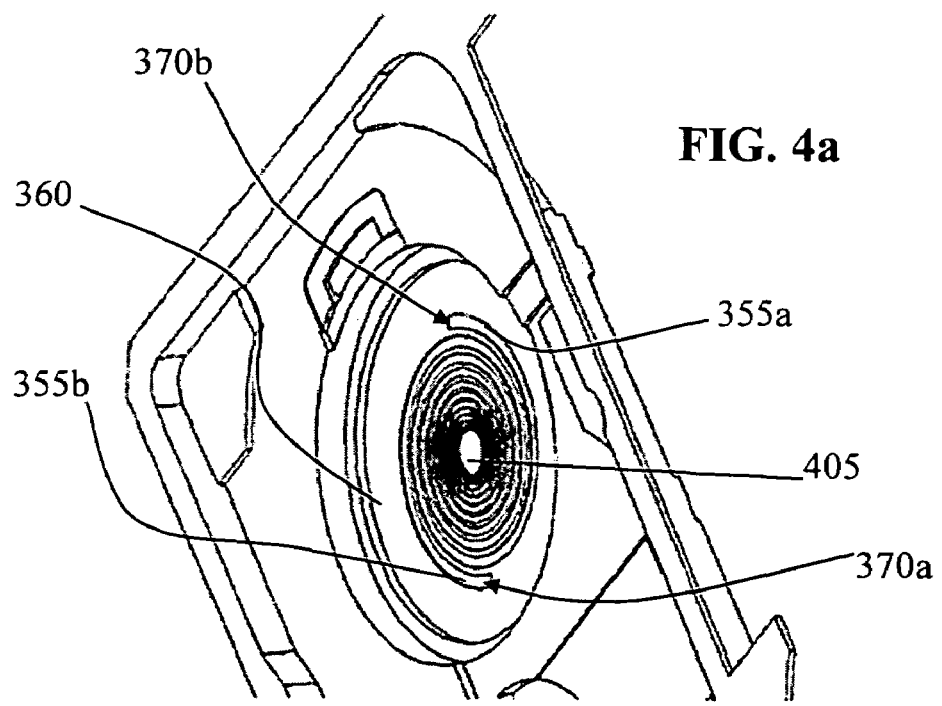
FIG. 4a illustrates a perspective view of an exemplary column capillary seal that may be used in the disc drive motor of FIG. 3.
Figure 4B:
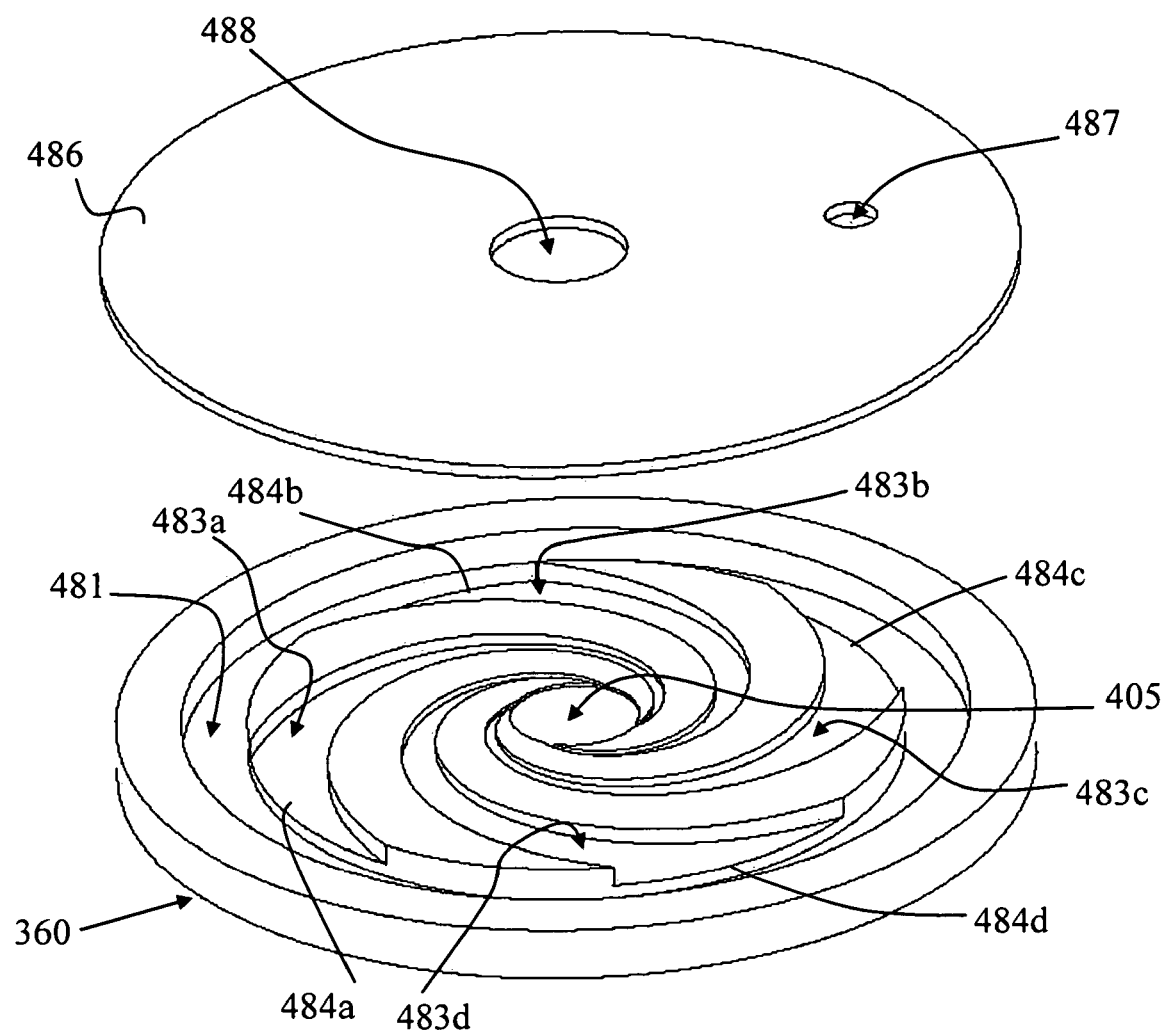
FIG. 4b illustrates an exemplary column capillary seal that may be used in the disc drive motor of FIG. 3.

Turning now to FIGS. 4a and 4b, further explication of exemplary column shaped capillary seal 355 is provided. Exemplary capillary seal 355 contains two distinct column shaped capillary seals (355a and 355b), capillary seals 355a and 355b include a respective channel defined by a generally planar surface of base 360, vent openings 370a and 370b and bearing openings 365a and 365b (at center, general location illustrated in cross section of FIG. 3). As illustrated, the channels of capillary seals 355a 355b are disposed as co-axial planar spiral shapes with vent opening 370a opposite vent opening 370b. The spiral shapes converge on a central portion 405. Bearing openings 365a and 365b (indicated in cross section in FIG. 3) may also be formed for a disposition that provides for bearing openings 365a and 365b to be on opposite sides of shaft 305 (FIG. 3). Thus, capillary seal 355 includes a structure having defined therein one or more channels, each channel with at least two openings, one of the openings for providing lubricating liquid to hydrodynamic bearing regions, and the other opening for venting the channel to an ambient environment.

Although FIG. 4a illustrates capillary seal 355 as including two separate spiral shaped capillary seals 355a and 355b (each having a distinct channel), capillary seal 355 may be comprised of fewer or more separate capillary seals that may be disposed as co-axial spirals, or other shapes that provide for a column shaped capillary seal (i.e., a spiral is a convenient, but not a sole disposition for a column shaped capillary seal). Capillary seals 355a and 355b may be formed by removing material from the surface of base 360, by adding material to base 360, such as by attaching a spiral shape to the surface of base 360, or by other methods of formation such as stamping, which displaces material from one portion of base 360 to another portion of base 360. Cover 350 may be altered to accommodate such differences where desirable. Additionally, capillary seals 355a and 355b could be formed in part or whole by adding material to or removing material from cover 350. For instance, a spiral shaped channel may be formed in cover 350 and another may be formed in base 360. The spiral channels may be aligned to result in one capillary seal, or may be aligned such that lands (portions of base 360 higher than a bottom portion of the spiral channel) of one opposing surface provide a "cover" for the channel(s) on the other opposing surface.

Exemplary column capillary seals may also be defined by using a thin layer disposed between base 360 and cover 350 (FIG. 3). The thin layer may be stamped, or otherwise manipulated, so that at least one first spiral channel is formed on a bottom surface of the thin layer and at least one second spiral channel is formed on a top surface of the thin layer. Thus, one column capillary seal is formed between base 360 and the bottom surface of the thin layer, and another column capillary seal is formed between cover 350 and the top surface of the thin layer. In such examples, base 360 and cover 350 may be smooth, or may have formations defined to interact with the spiral channels formed respectively on the bottom surface and the top surface of the thin layer. When viewed in cross section generally perpendicular to the top and bottom surfaces) portions of the first spiral channel and the second spiral channel interleave with each other (i.e., proceeding either toward or away from a center portion of base 360). In other aspects, the top and the bottom surface may define channels in any of a variety of shapes, including and additionally to spiral shapes.

All of the above-mentioned exemplary column capillary seals may be defined by one or more surfaces in any of a variety of shapes, including and in addition to spiral shapes. For example, channels may have various radii of curvature, they may be straight, partially curved and partially straight, or any of a variety of other characteristics within the contemplation of one of ordinary skill in the art. Also, any such channels may taper in a width dimension, a height dimension, or in both width and height dimensions.

A characteristic of exemplary capillary seals 355a and 355b (and hence, capillary seal 355) is that each has a relatively long length compared with a width (a length viewed as though the spiral shape were "unwound"). Referring back to FIGS. 2a/b, it is apparent that prior art capillary seal 210 is wider compared with its length than are capillary seals 355a and 355b.

Another characteristic of exemplary capillary seals 355a and 355b (and hence, capillary seal 355) is their respective cross-sections. Samples of each capillary seal 355a and 355b cross-section (such samples conveniently referred to herein as cross-sections) may be taken at an arbitrary point along respective lengths of capillary seals 355a and 355b (i.e., along each channel of each of capillary seals 355a and 355b). Cross-sections may be locally perpendicular to a side wall of the channels or at an arbitrary angle with respect to such channel side walls (not separately indicated in FIGS. 4a and 4b).

Figure 5A:
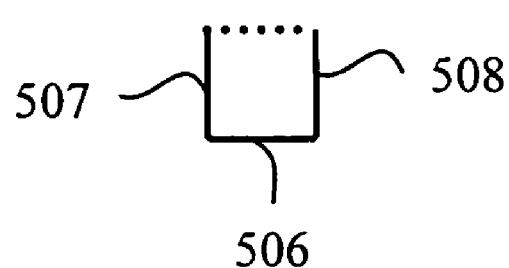
FIG. 5a-c illustrate exemplary cross-sections of exemplary column capillary seals.
Figure 5B:
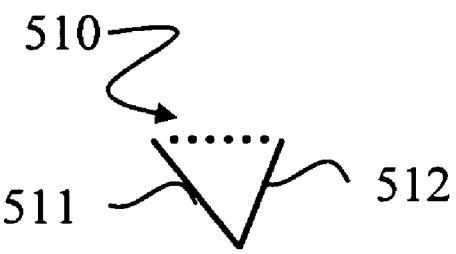
Figure 5C:
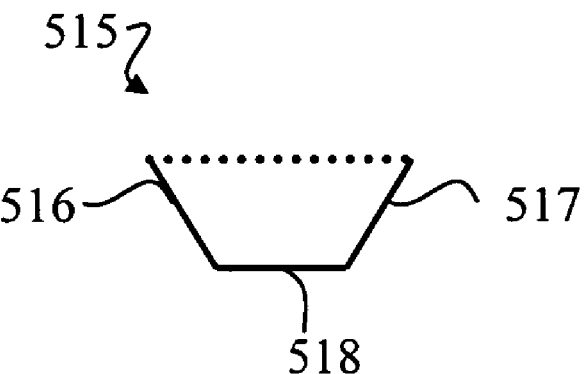

With further regard to aspects of cross-sections of exemplary column shaped capillary seals, these cross-sections may be specified by specifying a dimension of an outer boundary without regard to an inner boundary, rather than by requiring specification of both outer boundary and inner boundary dimensions, as in the case of typical annular cross-section prior art capillary seals, such in FIG. 2a/b. Exemplary shapes for some such cross-sections are illustrated in FIGS. 5a-c.

Dashed lines represent a portion of the cross-section that, for an operational motor, may be provided by any opposing surface, including surfaces that are relatively stationary and relatively rotating with respect to the channels. By example, the dashed line may represent cover 350. During assembly of the motor and during construction of components of the motor, the dashed line may represent an imaginary line across the channel for completing the channel cross-section. Cross-section shapes other than those illustrated are possible.

In addition to the shape of cross-sections of capillary seals 355a and 355b, another characteristic is the area (size) of the cross-sections. Cross-sections of capillary seals 355a and 355b taken closer to vent openings 370a and 370b have a larger area than cross-sections taken closer to bearing openings 365a and 365b. This difference in cross-section area is generally referred to as a taper of a capillary seal. Such taper may be smooth, such that the cross-section area gradually decreases from vent openings to bearing openings. The taper may be linear or non-linear.

Capillary seal 355 may be characterized as being column shaped by virtue of its being relatively long compared with the area of its cross-section. Capillary seal 355 is also distinguished by virtue of its cross-section being topologically equivalent to a circle at least one point along capillary seal 355 (i.e., if a cross-section of capillary seal 355 were to be taken at mechanically possible intervals, at least one of those cross-sections would be topologically equivalent to a circle). Thus, a portion of capillary seal 355 (i.e., a channel of capillary seal 355) may have a cross-section shaped like a rectangle, a circle, a semi-circle, a triangle, a trapezoid, or equivalent shape (some of which are illustrated in FIGS. 5a-c).

It is contemplated that a column shaped capillary seal, such as capillary seal 355, may have a cross-section qualitatively topologically equivalent to a circle. For example, where an outer boundary of the cross-section is substantially greater than an inner boundary of the cross-section, but where the inner boundary remains present. Such exemplary cross-sections may not strictly be considered topologically equivalent to a circle, but capillary seals having such a cross-section would be expected to function substantially similarly to capillary seals that do have a cross section topologically equivalent to a circle.

FIG. 4b illustrates another exemplary column shaped capillary seal configuration that may be used in exemplary motor 300 of FIG. 3. A portion of base 360 is illustrated. A circumferential trench 481 is formed about a plurality of column shaped capillary seals 483a-d. Each column shaped capillary seal includes a respective vent openings 484a-d in fluidic communication (including gaseous fluids) with circumferential trench 481 and respective hydrodynamic bearing openings (not separately indicated) defined proximate central portion 405. As illustrated, each column shaped capillary seal 483a-d is curved and radiates from near central portion 405 towards circumferential trench 481. Each column shaped capillary seal 483a-d tapers from a larger cross-section area at respective vent openings 484a-d to a smaller cross-section area at respective hydrodynamic bearing openings.

FIG. 4b further illustrates cover 486 formed for a disposition over the portion of base 360 illustrated. Cover 486 includes vent 487, which is disposed during motor assembly for fluidic communication (including gaseous fluids) with circumferential trench 481. Vent 487 provides fluidic communication for column shaped capillary seals 483a-d to ambient environment 380. Exemplary cover 486 also includes a shaft hole 488 for shaft 305. In some examples, a shaft may be disposed on cover 486 or in an indentation portion of cover 486 formed for accepting that shaft rather than extending through shaft hole 488, so long as fluidic communication between column shaped capillary seals 483a-d and hydrodynamic bearing regions 320 is provided by some other means. If desired, cover 486 may be adapted to rotate with or relative to base 360.

FIGS. 5a-c illustrate exemplary cross-sections of channels of exemplary column shaped capillary seals 355a and 355b. FIG. 5a illustrates a generally rectangular cross-section 505 (which is topologically equivalent to a circle). Bottom portion 506 and first side wall portion 507 and second side wall portion 508 may be formed by removing material from a surface, such as base 360. Top portion 508 may be supplied by an opposing surface. FIG. 5b illustrates a triangular shaped cross-section 510. First side wall portion 511 and second side wall portion 512 may be formed by removing material from a surface, such as base 360. FIG. 5c illustrates a trapezoidal shaped cross-section 515. First side wall portion 516, second side wall portion 517, and bottom portion 518 may be formed by removing material from a surface, such as base 360. As described above, capillary seal cross-sections may taper along a length of a channel of the capillary seal. Depending on a shape of the cross-section, one or more dimensions of the cross-section may change in order to accomplish this taper. By example, in regard to the rectangular cross-section 505 of FIG. 5a, a width of bottom portion 506 may be changed. A height of side wall portion 507 and/or side wall portion 508 may also be changed. For semi-circular or circular type cross-sections, a radial dimension may be changed. Different dimensions or different portions of a given cross-section may be changed at different points along the channel to effect a taper. By example, a height dimension may change in one portion and a width dimension in another. By further example, a radial dimension may be changed non-uniformly such that a semi-circle cross-section becomes semi-elliptical along a channel. Other variations are within the scope of one of ordinary skill in the art.

Generally, a distinction between cross-sections of FIGS. 5a-c and many prior art capillary seals is that the cross-section of known prior art capillary seals are topologically equivalent to an annular surface rather than a circle (as discussed with regard to FIGS. 2a/b). Exemplary channels having the afore-mentioned cross-section topology at one point along the channel need not have this cross-section topology at other points where a cross-section may be taken. For instance, other cross-sections of such a channel may be topologically equivalent to a annular surface.

Figure 6:
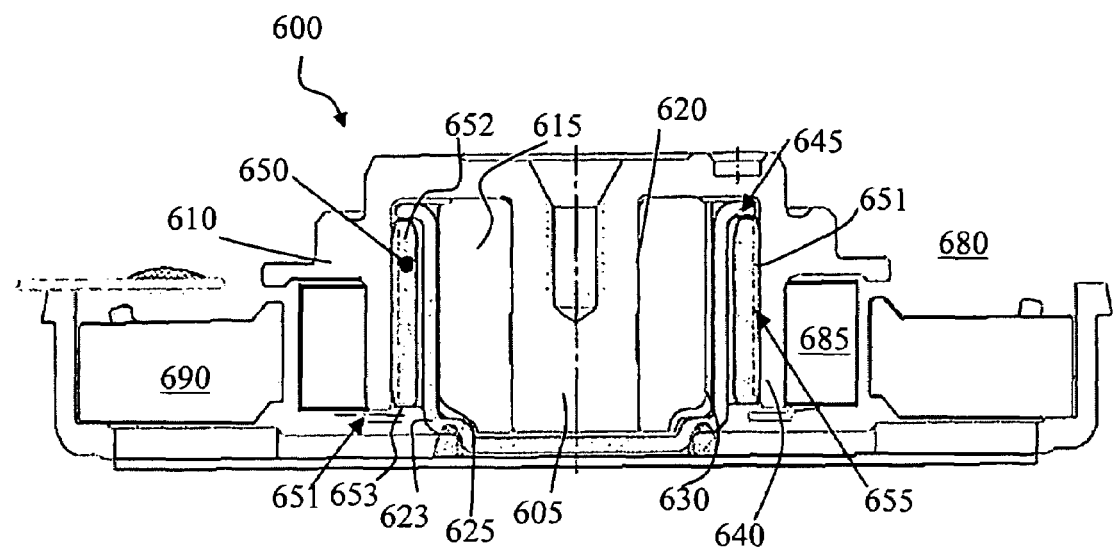
FIG. 6 illustrates another exemplary disc drive motor in which aspects of exemplary capillary seals may be used.

Now turning to FIG. 6, a vertical cross-section of another exemplary spindle motor 600 is illustrated. The exemplary motor 600 includes a shaft 605, and a co-axially disposed hub 610 coupled with shaft 605. A sleeve 615 and shaft 605 interface to form hydrodynamic bearing regions 620, which supports rotation of shaft 605 and hub 610 about sleeve 615. Sleeve 615 has an outer surface 625 that interfaces with cup 623 to form a recirculation channel 630. A back iron 640 portion of hub 610 includes an inner surface that interfaces with an outer surface 651 of seal ring 650. As further described below, column shaped capillary seal 655 (generally indicated with dashed lines) is defined by outer surface 651 and is disposed at the interface between the inner surface of hub 610 and the outer surface 651 of seal ring 650. A top 652 of seal ring 650 interfaces with cup 623 to form an annular opening 645, at which a secondary meniscus of lubricating liquid forms. Cup 623 also supports sleeve 615. Magnet 685 couples with back iron 640 to face a stator 690 that electromagnetically interacts with magnet 685 for radially propelling hub 610 and shaft 610 about sleeve 615. A splash guard 651 may be disposed proximate a bottom 653 of seal ring 650.

Figure 7A:
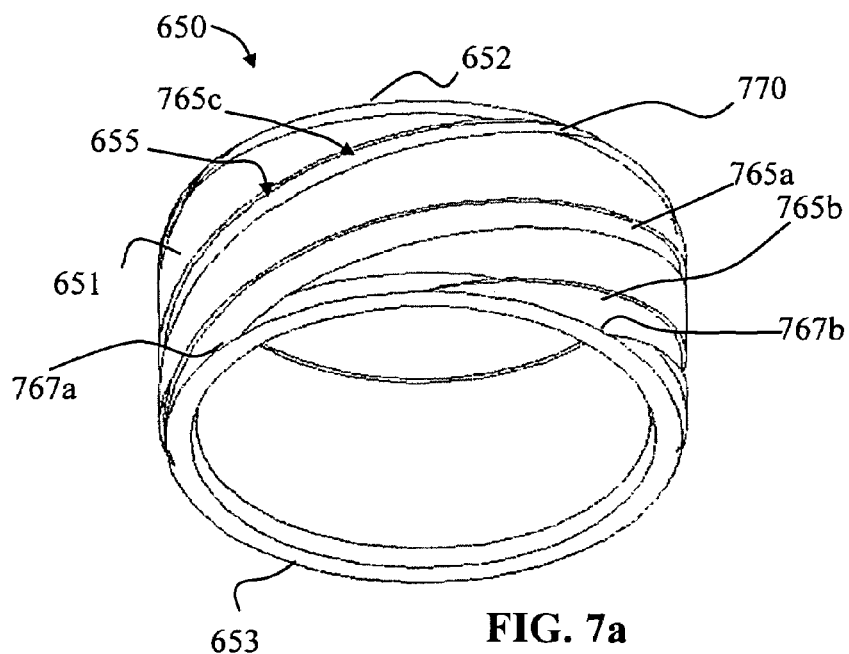
FIG. 7a illustrates an exemplary column capillary seal that may be used in the exemplary disc drive motor of FIG. 6.

As will be further discussed with regard to FIGS. 7a/b, capillary seal 655 includes bearing openings and vent openings. The bearing openings provide fluidic communication between capillary seal 655 and hydrodynamic bearing regions 620. The vent openings vent capillary seal 655 to ambient environment 680, which may contain air or another gas or mixture of gases. As illustrated, capillary seal 655 is disposed between two surfaces that do not relatively rotate with respect to each other (inner surface of hub 610 and outer surface 651 of seal ring 650). However, it is notable that in this example, capillary seal 655 rotates with hub 610. Other exemplary capillary seal dispositions and configurations are possible, and some of them are further illustrated herein.

FIG. 7a illustrates an exemplary seal ring 650 and exemplary column shaped capillary seal 655 (a portion indicated). Exemplary capillary seal 655 is disposed on (or defined by) outer surface 651 of seal ring 650 in a circumferential spiral (helical) shape and comprises multiple separate channels 765a-c extending from vent openings 767a-b (additional vent openings not shown) at bottom 653 of seal ring 650 to hydrodynamic bearing openings (one hydrodynamic bearing opening 770 shown) at top 652 of seal ring 650. As with exemplary capillary seal 355, described with respect to FIGS. 3, 4a, and 4b, capillary seal 655 may comprise fewer or more separate channels, wherein each channel may form a functionally distinct capillary seal or reservoir.

Figure 7B:
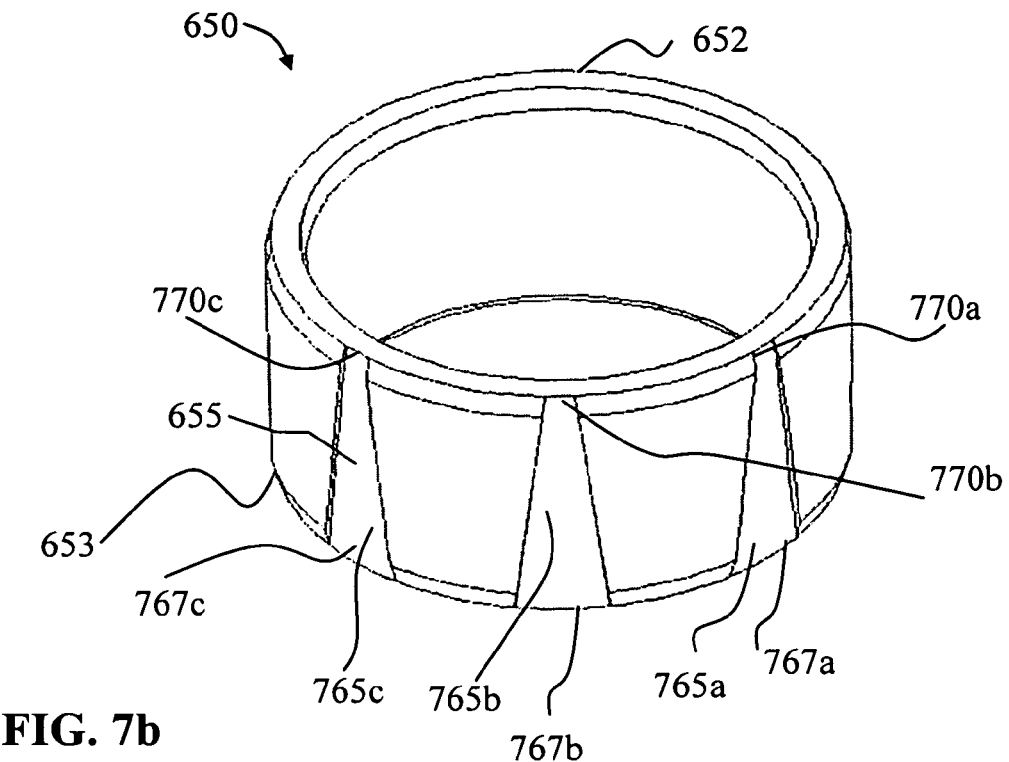
FIG. 7b illustrates another exemplary column capillary seal that may be used in the exemplary disc drive motor of FIG. 6.

FIG. 7b illustrates another design for exemplary seal ring 650 and exemplary column shaped capillary seal 655 (a portion indicated). Exemplary capillary seal 655 is disposed on (or defined by) outer surface 651 of seal ring 650. Capillary seal 655 comprises multiple separate channels 765a-c (additional channels not illustrated) disposed substantially parallel to an intended axis of rotation of seal ring 650 and extending from vent openings 767a-c (some vent openings not shown) at a bottom 653 of seal ring 650 to hydrodynamic bearing openings 770a-c (some hydrodynamic bearing openings not shown) at a top 652 of seal ring 650. As with exemplary capillary seal 355, described with respect to FIGS. 3, 4a, and 4b, capillary seal 655 may comprise fewer or more separate channels.

Although FIGS. 7a/b illustrate seal ring 650 with a generally cylindrical surface, on which is formed one or more column capillary seals, non-cylindrical surfaces may also be used to define column capillary seals, such surfaces may be generally conical, spherical, and the like.

Figure 8:
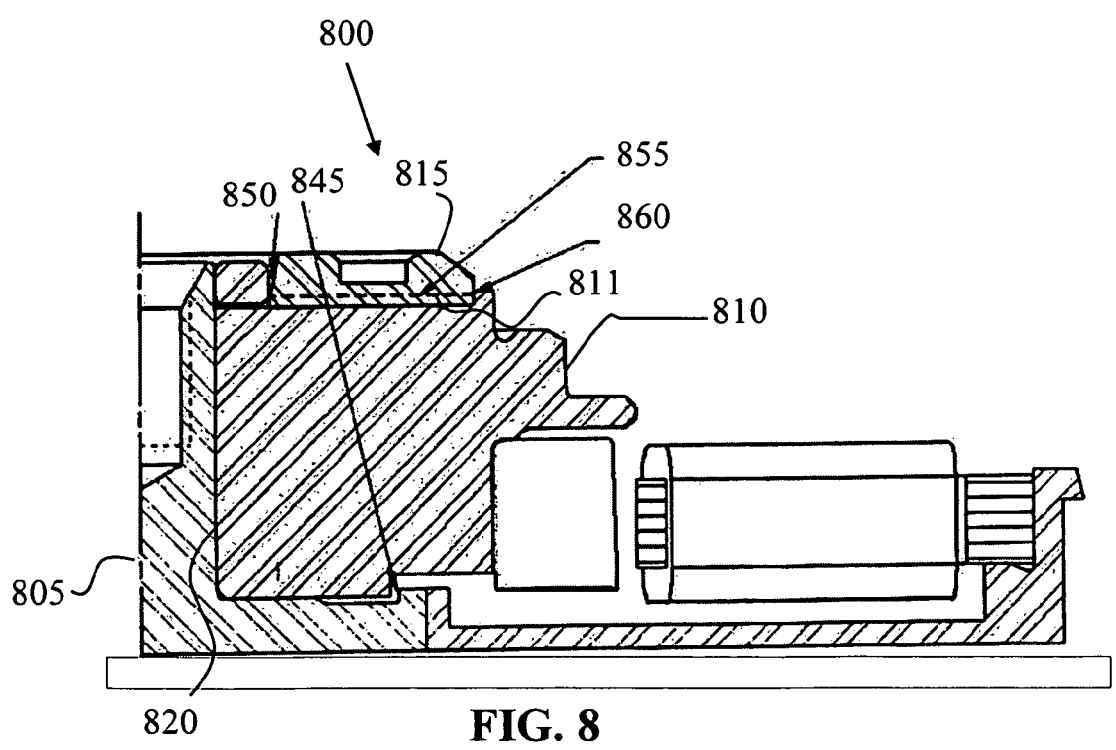
FIG. 8 illustrates a cross-section of a third exemplary disc drive motor wherein aspects of exemplary column capillary seals may be used.

FIG. 8 illustrates, in the context of a motor 800 cross-section, aspects of another exemplary capillary seal. Rotating hub 810 is co-axially disposed about stationary shaft 805 and interfacing surfaces of hub 810 and shaft 805 form hydrodynamic bearing regions 820. Hydrodynamic bearing regions 820 may comprise one or more journal bearings and/or thrust bearings. Hydrodynamic bearing regions 820 vents to an ambient environment at first opening 845, at which lubricating liquid forms a meniscus. At bearing opening 850, hydrodynamic bearing regions 820 is in fluidic communication with capillary seal 855 (disposition of which is generally indicated by dashed lines, but which is otherwise not shown). Capillary seal 855 vents with the ambient environment via vent opening 860.

Capillary seal 855 is formed in coverplate 815, which interfaces with a top surface 811 of hub 810. In this example, top surface 811 of hub 810 provides a covering for capillary seal 855. In other examples, capillary seal 855 may be formed in hub 810 and coverplate 815 may provide the cover. In this example, capillary seal 855 is disposed on a member of motor 800 that rotates about a fixed member (shaft 805). Further, capillary seal 855 is disposed between two members that remain stationary with respect to each other (coverplate 815 and hub 810). Exemplary capillary seal 855 may have a planar, circumferential, or conical spiral shape, straight shapes, curved shapes, or another shape.

Capillary seal 855 may include one or more channel(s) (e.g., channels similar to those shown in FIGS. 4a and 4b) formed in either hub 810 or coverplate 815, each channel in fluidic communication with vent opening 860 (i.e., vent opening 860 may be one opening, several openings or one continuous opening disposed about a perimeter of the interface between coverplate 815 and hub 810). Each channel is also in fluidic communication with hydrodynamic bearing regions 820 through one or more bearing openings 850 (such as those illustrated in FIGS. 4a-4b). The bearing openings 850 have a cross-section with a smaller area than vent openings 860 and the channel(s) may gradually taper in one or more dimensions from each respective vent opening to each respective bearing opening. The taper may be linear or non-linear. In aspects, channel cross-sections may at one or more points be topologically equivalent to a circle. Generally, lengths of the channels may be substantially greater than width and height dimensions of cross-sections of the channels.

Figure 9:
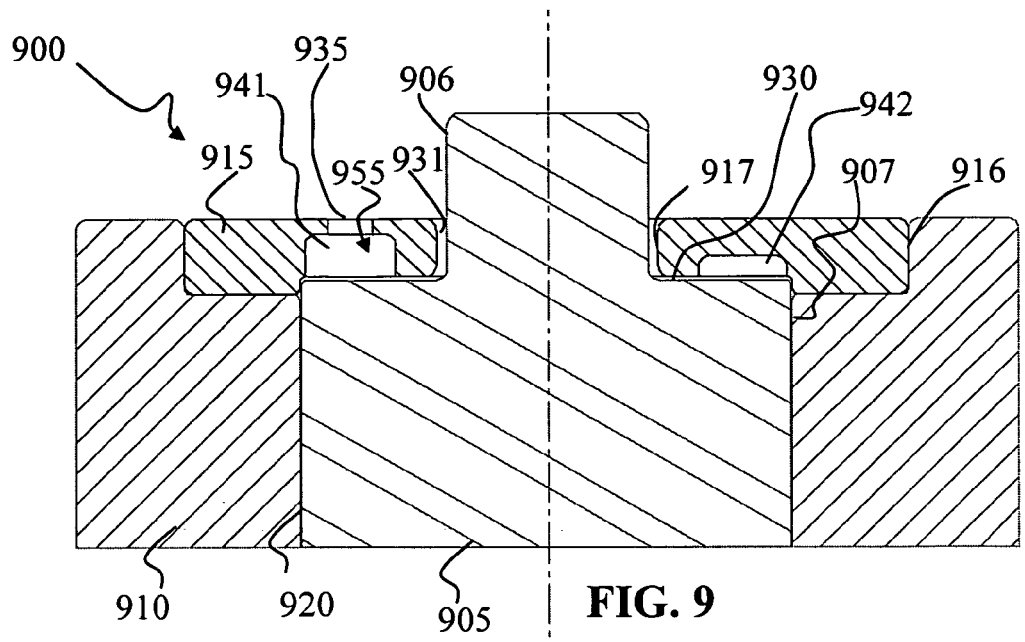
FIG. 9 illustrates a cross-section of a fourth exemplary disc drive motor portion.

FIG. 9 illustrates a vertical cross-section of a portion of a motor 900. In aspects presented here, column shaped capillary seals may be disposed between relatively rotating members of motor 900. Shaft 905 includes a major diameter portion 907 and a minor diameter portion 906. Hub 910 is co-axially disposed about shaft 905 at major diameter portion 907. Shield 915 includes outer radial portion 916 that couples with hub 910 and which supports an inner radial portion 917 disposed proximate minor diameter portion 906 of shaft 905. Major diameter portion 907 interfaces with an inner surface of hub 910 to form hydrodynamic bearing regions 920.

A radial gap 931 is formed between an outer surface of minor diameter portion 906 and an inner radial surface 917 of shield 915. Radial gap 931 is in fluidic communication with an axial gap 930 disposed between a top surface of major diameter portion 907 and a bottom surface of shield 915. In aspects, radial gap 931 is somewhat greater than axial gap 930 such that lubricating liquid preferentially seeks axial gap 930. A column shaped capillary seal 955 (indicated in cross-section in FIG. 9) is in fluidic communication with axial gap 930 and hydrodynamic bearing regions 920. Cross-sections of portions of the capillary seal are illustrated in FIG. 9, including large cross-section portion 941 and smaller cross-section portion 942. A fill hole 935 for lubricating liquid is disposed in shield 915, near large cross-section portion 941.

Figure 10:
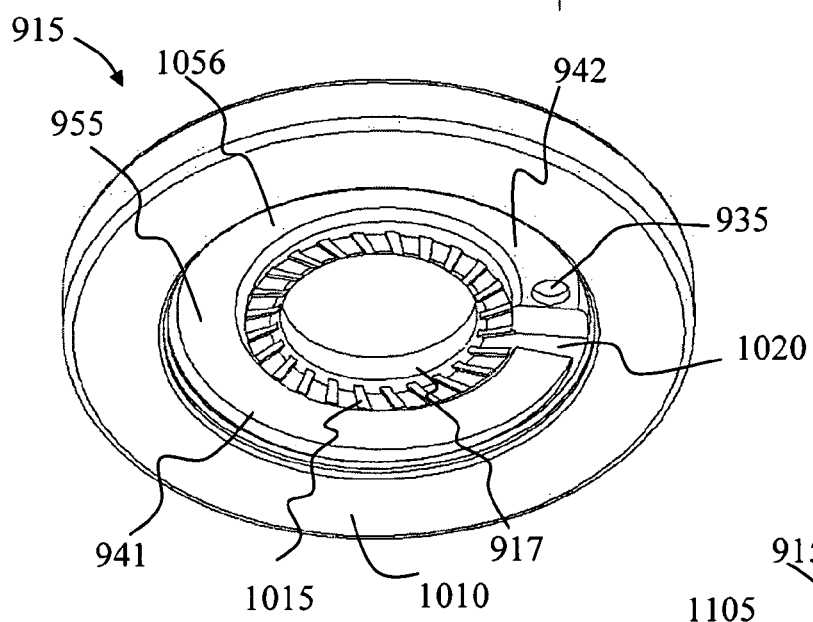
FIG. 10 illustrates a perspective view of a disc drive motor member having an exemplary column capillary seal that may be used in the disc drive motor portion of FIG. 9.

Capillary seal 955 is further illustrated in FIG. 10. FIG. 10 illustrates an exemplary bottom surface 1010 of shield 915. As illustrated in cross-section FIG. 9, inner radial surface 917 is formed to create radial gap 931. Pumping grooves 1015 are disposed on bottom surface 1010 and configured to pump lubricating liquid away from radial gap 931 and the central hole. FIG. 10 illustrates that large cross-section portion 941 and small cross-section portion 942 of capillary seal 955 result from a channel 1056 formed in bottom surface 1010. In aspects, channel 1056 gradually tapers in depth and/or width from large cross-section portion 942 to small cross-section portion 941. Large and small cross-section portions may also be known respectively as wide and narrow portions. Channel 1056 may taper in a width dimension, a height dimension, or in some combination of width and height dimensions.

As illustrated in FIG. 10, capillary seal 955 includes a channel 1056 having a cross-section that is generally topologically equivalent to a circle at one or more points along channel 1056 (such as large cross-section portion 941 and large cross-section portion 942). Here, the cross-section may be defined by channel 1056 and the opposing top surface of major diameter portion 907, without considering axial gap 930.

Also, a length dimension of capillary seal 955 is relatively large compared with dimensions defining its cross-section. As with other aspects illustrated herein, precise distinctions relating to ratios of lengths to other dimensions is not intended nor required. Rather those of skill in the art would understand that prior art capillary seals are typically more functionally limited (constrained) as to ratios of lengths to other dimensions. Such functional limitations are due to sizing constraints of particular motor designs, a desired volume of lubricating liquid to be stored, desired seal robustness, and other such considerations.

In exemplary operation, shield 915 and hub 910 rotate relative to shaft 905. Such relative rotation creates shear forces that urge lubricating liquid disposed in channel 1056 towards small cross-section portion 941. Pumping grooves 1015 urge lubricating liquid from radial gap 931 into capillary seal 955 (channel 1056 of FIG. 10). Thus capillary seal 955 maintains a ready supply of lubricating liquid for hydrodynamic bearing regions 920 while keeping lubricating liquid from both fill hole 935 and radial gap 931. Capillary reservoirs having characteristics of capillary seal 955 may be disposed in other locations within a FDB motor, such as near a bottom of a hub or a shaft rather than near a top, such as illustrated herein.

Characteristics of capillary seal 955 may be varied as well. For example, flat portion 1020 in FIG. 10 separates large cross-section portion 942 from small cross-section portion 941. Flat portion 1020 may be defined at different locations relative to cross section portions 942 and 941. For example, flat portion 1020 may be disposed generally radially opposite vent 935 in channel 1056, thereby effectively dividing channel 1056 at that point. In such an example, channel 1056 may be designed to taper along each side of channel 1056. The taper would typically be in one or more of a width and height dimension of channel 1056 from larger dimensions proximate vent 935 to smaller dimensions proximate flat portion 1020. Such an example would functionally create two channels, each having its own meniscus in a different portion of channel 1056.

Figure 11:
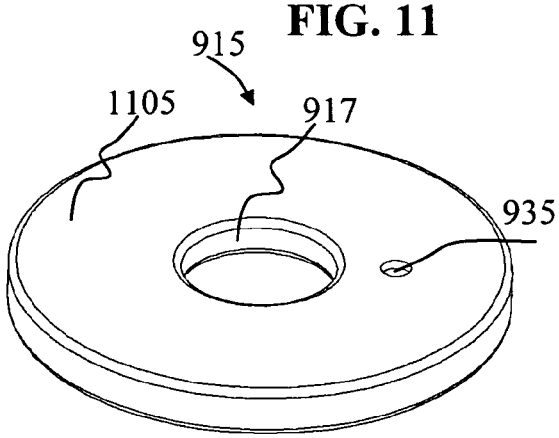
FIG. 11 illustrates a perspective view of an exemplary top surface of the member of FIG. 10.

FIG. 11 illustrates a top surface 1105 of shield 915 with fill hole 935 and inner radial surface 917 illustrated. Top surface 1105 as illustrated is smooth, but it may be adapted as desired to be non-smooth in any number of ways.

Motor members and portions of motor members described herein may be formed, worked, and otherwise manipulated in accordance with aspects described above by any of a variety of methods and means, including electro-chemical etching, stamping, milling, injection molding, and the like. Various methods and means may be used at different stages of production. Selection of particular production means and methods based on the disclosure herein is within the scope of one of ordinary skill in the art.

Various motor and capillary seal aspects have been illustrated and described herein. In some figures, rotating shaft designs have been presented while in others, fixed shaft designs have been presented. One of ordinary skill in the art would understand that teachings related to each may be adapted to the other design. Also, it would be understood that certain components have been separately identified herein, but such identification does not imply that such components must be separately formed from other components. Similarly, components identified herein may be subdivided into sub-components in other designs. Additionally, features such as recirculation channels, bearing surfaces, pumping grooves, and the like may be disposed additionally or differently than presented in aspects herein.

Other modifications and variations would also be apparent to those of ordinary skill in the art from the exemplary aspects presented. By example, various exemplary methods and systems described herein may be used alone or in combination with various fluid dynamic bearing and capillary seal systems and methods. Additionally, particular examples have been discussed and how these examples are thought to address certain disadvantages in related art. This discussion is not meant, however, to restrict the various examples to methods and/or systems that actually address or solve the disadvantages.

We claim:

1. A reservoir to store a lubricating fluid for use in a motor having a fluid dynamic bearing, the reservoir comprising:

a structure including a base and a cover defining therebetween an enclosed column shaped first channel having a first opening, a second opening, and a cross-section in which the cover defines a portion of the enclosed column shaped first channel, the enclosed column shaped first channel formed for fluidic communication with the fluid dynamic bearing through the second opening and with a gaseous environment through the first opening.

2. The reservoir of claim 1, wherein an area of the cross-section of the first channel is greater at the first opening than at the second opening.

3. The reservoir of claim 2, wherein the area tapers uniformly from the first opening to the second opening.

4. The reservoir of claim 1, wherein the base and the cover remain stationary with respect to each other.

5. The reservoir of claim 1, wherein the cover includes a generally planar first surface, the first surface defining at least a portion of the first channel as a radial spiral shape with the second opening radially inward of the first opening.

6. The reservoir of claim 1, wherein the the base and the cover further define therebetween an enclosed column shaped second channel, the second channel having a first opening, a second opening, and a cross-section in which the cover defines a portion of the enclosed column shaped channel, the cross-section of the second channel at the first opening having an area greater than an area of the cross-section of the second channel at the second opening, the second channel defined for fluidic communication with the hydrodynamic bearing through the second opening of the second channel and for venting the second channel through the first opening of the second channel to the gaseous environment.

7. The reservoir of claim 6, wherein the cover includes a generally planar surface defining the first channel and the second channel as co-axial spiral shapes.

8. The reservoir of claim 1, wherein the cross-section of the first channel at a point along the first channel is topologically equivalent to a circle.

9. The reservoir of claim 1, wherein the cover includes a first surface, the first channel is defined at least in part by the first surface, and the first surface is generally of a shape selected from among cylindrical, conical, and spherical shapes.

10. The reservoir of claim 9, wherein the first surface generally defines the first channel as a circumferential spiral beginning from proximate a bottom of the structure and terminating proximate a top of the structure.

11. The reservoir of claim 9, wherein the structure is generally cylindrical and has a first end and a second end, the first opening of the first channel proximate the first end and the second opening of the first channel proximate the second end, the first channel defined to taper generally parallel with a long axis of the structure.

12. The reservoir of claim 9, wherein the base includes a second generally cylindrical surface and wherein the first surface is a first generally cylindrical surface which opposes the second generally cylindrical surface, and the first generally cylindrical surface and the second generally cylindrical surface are relatively stationary.

13. The reservoir of claim 1, wherein the structure includes a generally planar first surface, the first channel is one of a plurality of enclosed column shaped channels defined at least in part by the first surface, each of the plurality of enclosed column shaped channels having a respective cross section in which the cover defines a portion of said each enclosed column shaped channel, a first opening for venting to the gaseous environment, and a second opening for fluidicly coupling to the hydrodynamic bearing region, and wherein each of the plurality of enclosed column shaped channels is defined such that each first opening of each channel is defined proximate a radially outer portion of the first surface, each second opening is defined proximate a radially inner portion of the first surface, and each enclosed column shaped channel is curved in the plane of the first surface.

14. The reservoir of claim 13, wherein the first surface further defines a trench circumscribing each first opening of each of the plurality of enclosed column shaped channels.

15. The reservoir of claim 14, further comprising an opposing second surface, and wherein each first opening of each of the plurality of channels fluidicly couples to the gaseous environment through a vent opening in the opposing second surface.

16. The reservoir of claim 1, wherein the cover includes a generally planar first surface, the structure defines a central hole through the first surface, and the first channel is defined by the first surface as radially circumscribing at least a portion of the central hole, at least a portion of the first channel tapering in one or more of a height dimension and a width dimension from the first opening towards the second opening.

17. The reservoir of claim 16 further comprising:
a lubricating liquid disposed in the column shaped first channel.

18. The reservoir of claim 17, wherein the structure is rotatable, and the first surface further defines pumping grooves proximate the central hole for pumping the lubricating liquid away from the central hole.

19. The reservoir of claim 18, wherein the structure rotates with a hub relative to a stationary shaft.

20. A motor lubricated by a fluid, the motor comprising:
a fluid dynamic bearing region; and
a reservoir including first and second motor members defining therebetween an enclosed column shaped first channel having a first opening for venting the first channel to a gaseous environment, a second opening for fluidicly coupling the first channel to the fluid dynamic bearing region, and a cross-section in which the first and second motor members define a portion of the enclosed column shaped first channel,
such that during operation a lubricating liquid is disposed in at least a portion of the first channel and forms a first meniscus therein.

21. The motor of claim 20, wherein an area of the cross-section at the first opening is larger than an area of the cross-section at the second opening.

22. The motor of claim 20, wherein one or more of a height dimension and a width dimension of the cross section tapers from the first opening towards the second opening along at least a portion of the column shaped first channel.

23. The motor of claim 20, wherein the fluid dynamic bearing region further includes an opening to the gaseous environment, and the lubricating liquid forms a second meniscus in at least a portion of the fluid dynamic bearing region proximate the opening of the fluid dynamic bearing region to the gaseous environment.

24. The motor of claim 20 wherein the second motor member is coaxially disposed about the first motor member.

* * * * *